INVENTOR
F. G. EGGERS
BY
ATTORNEY

United States Patent Office

3,260,933
Patented July 12, 1966

3,260,933
IMPEDANCE TESTING CIRCUIT TO AUTOMATICALLY DISPLAY THE REAL AND IMAGINARY COMPONENTS OF A COMPLEX IMPEDANCE OR ADMITTANCE FOR A SWEPT FREQUENCY BAND
Frieder G. Eggers, Madison, N.J., assignor to Bell Telephone Laboratories, Incorporated, New York, N.Y., a corporation of New York
Filed Nov. 13, 1962, Ser. No. 237,223
8 Claims. (Cl. 324—57)

This invention relates to electrical testing, and more particularly to a circuit for separately displaying the magnitudes of the real and imaginary components of the impedance or the admittance of an electrical device over a range of frequencies.

The object of the invention is to display separately, over a selected frequency range, the resistive and the reactive components of the impedance, or the conductive and the susceptive components of the admittance, of a one-port electrical device.

The impedance or admittance testing circuit in accordance with the invention comprises a signal source providing a variable-frequency test voltage which periodically sweeps over the selected range. This voltage is connected in series with a closed transmission loop which includes the series combination of the unknown device under test, a first resistor, and either a second resistor or a reactor. For admittance measurements, a first switch in one position connects the unknown device as the first element in the loop and the first resistor as the second. For impedance measurements, this switch is thrown to a second position to reverse the order of these two elements. The third element in the loop is either the second resistor or the reactor, depending upon the position of a second switch. The second resistor is used for reactance or susceptance measurements. The reactor is used for resistance or conductance measurements.

The voltage across the first element in the loop is fed back to the source to keep the voltage across the first element constant with frequency over the swept range. The voltage across the second element in the loop, either the unknown device or the first resistor, is amplified, if required, and impressed upon one input port of a linear adder. The voltage across the third element, either the second resistor or the reactor, is impressed upon an amplitude modulator. The oscillator associated with this modulator has a fixed frequency which is low compared to any frequency of the signal source, but high compared to the sweep frequency of the test voltage. The output of the modulator is passed through a second amplifier, if required, and impressed upon a second input port of the adder. This second amplifier has two output ports, with reversed voltages. A third switch selects one of these output voltages.

When reactance or susceptance measurements are being made, the modulated voltage derived from the modulator and impressed upon the second input port of the adder is reversed in phase with respect to, and must be adjusted to exceed somewhat in magnitude, the real part of the voltage on the first input port. For resistance or admittance measurements, the voltage on the second input port of the adder is in quadrature with the real part of the voltage on the first input port. This voltage is adjusted to exceed somewhat in magnitude the imaginary part of the voltage on the first input port.

The output voltage of the adder is amplified, if required, demodulated, filtered, and applied to one set of deflection plates of an oscilloscope. A saw-tooth sweep voltage, derived from the signal source, and synchronized with the sweep frequency, is applied to the other set of deflection plates of the oscilloscope. Now, if the third switch is being operated at a sufficiently high rate, the displacement from zero of the lower envelope of the luminous display on the screen is a measure of the magnitude of the resistance, the reactance, the admittance, or the susceptance of the unknown device, versus frequency, depending upon which characteristic is being measured. The third switch may be operated by hand or, preferably by some automatic means.

The nature of the invention and its various objects, features, and advantages will appear more fully in the following detailed description of a typical embodiment illustrated in the accompanying drawings, wherein.

Figure 1:
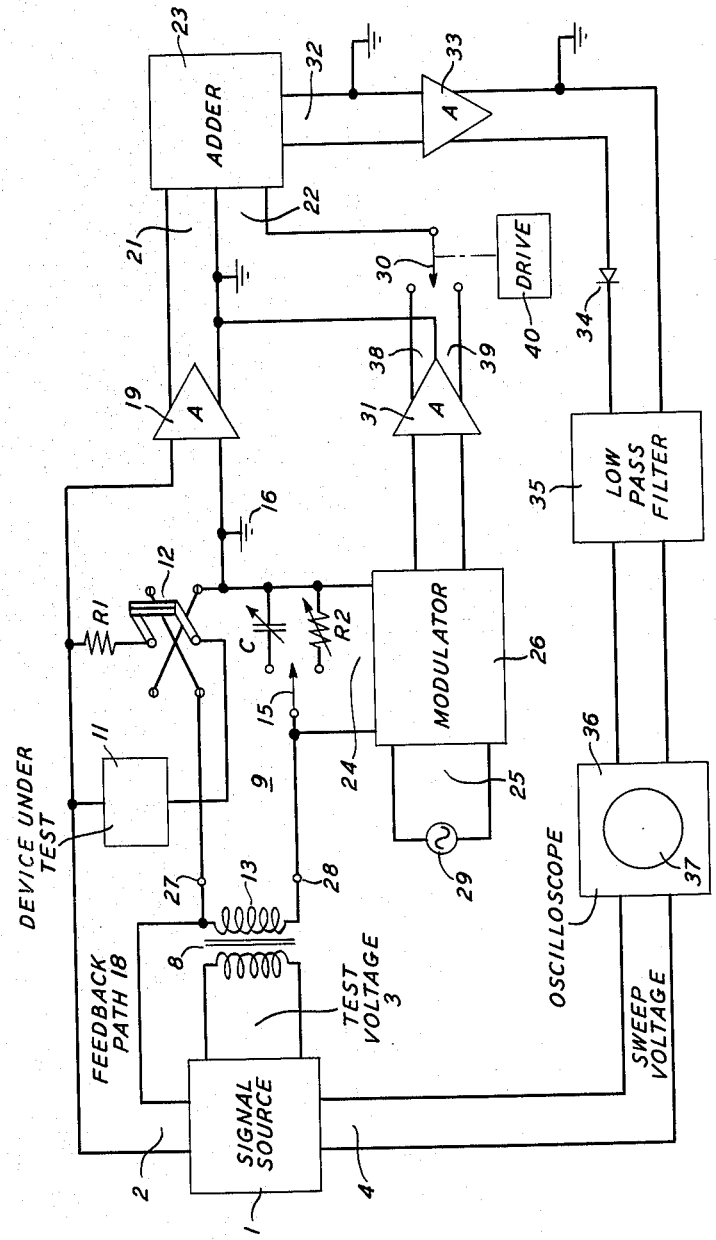
FIG. 1 is a schematic of a testing circuit adapted to provide an oscilloscope display, over a selected frequency range, of the real or the imaginary component of the impedance or the admittance of a one-port electrical device.

Referring particularly to FIG. 1, signal source 1 provides at a first output port 3 a variable-frequency test voltage which periodically sweeps over the selected range. The secondary winding 13 of a transformer 8 connects this voltage in series with a closed transmission loop 9 which includes the series combination of the one-port device 11 under test, a first resistor R1, and either a second resistor R2 or a reactor, shown as a capacitor C. This latter element could as well be an inductor. When the double-pole, double-throw switch 12 is thrown to the left, the device 11 is the first element and R1 the second element in the loop 9, starting at the upper terminal 27 of the winding 13. When the switch 12 is thrown to the right, R1 is the first and the device 11 is the second element in the loop 9. When the single-pole, double-throw switch 15 is thrown up, C is the third element in the loop 9, and when thrown down, R2 is the third element. The loop 9 may be grounded at one point, as shown at 16. For impedance measurements of the device 11, the switch 12 is thrown to the right, and for admittance measurements it is thrown to the left.

The voltage across the first element, R1 or 11, is applied to a feedback path 18 connected to an input port 2 of the source 1. The function of this feedback path 18 is to keep the voltage drop across the first element constant over the swept frequency range of the source 1, regardless of the loop load. The voltage across the second element in the loop 9 is passed through a first amplifier 19 and impressed upon a first input port 21 of the linear adder 23.

The voltage across the third element, C or R2, in the loop 9 is impressed upon an input port 24 of the amplitude modulator 26. It will be noted that, when R2 is in the circuit, the voltage at the port 24 is reversed in phase with respect to the voltage across R1 or the real part of the voltage across the device 11. When C is in the circuit, the voltage across the port 24 is in quadrature with the voltage across R1 or the real part of the voltage across the device 11. The resistor R2 is used for reactance or susceptance measurements, and C for resistance or conductance measurements. A fixed-frequency oscillator 29, connected to a second input port 25, drives the modulator 26. The frequency of the oscillator 29 must be low compared with any frequency of the source 1, but high compared to the sweep frequency of the test voltage, in order to obtain a steady display on the oscilloscope screen 37.

The modulated output voltage of the modulator 26 is impressed upon a second amplifier 31 which has two output ports 38 and 39, whose voltages are reversed in phase. A single-pole, double-throw switch 30 permits one of these output voltages to be selected for impression upon a second input port 22 of the adder 23.

The amplifiers 19 and 31 must have identical phase characteristics. Also, the modulator 26 must not introduce phase shift. Then, for reactance or susceptance measurements, the voltage on port 22 will be reversed in phase with respect to the real part of the voltage on the port 21, and is adjusted in magnitude to exceed this component, in order to obtain the proper oscilloscope display. On the other hand, for resistance or conductance measurements, the voltage on the port 22 will be in quadrature with the real part of the voltage on the port 21 and is adjusted to exceed in magnitude the reactive component of the voltage on the port 21. The input voltage at port 22 of the linear adder 23 is adjusted to its proper magnitude by adjusting the applicable one of either the variable reactor C or the variable resistor R2, whichever one happens to be connected across the input port 24 of the modulator 26.

Figure 2:
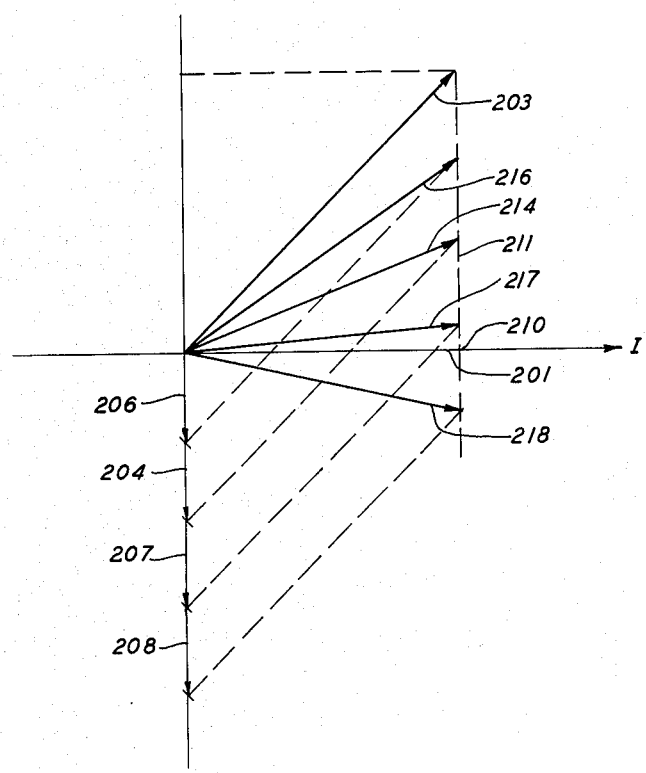
FIG. 2 is a vector diagram useful in the explanation of the operation of the invention.

The operation and purpose of the modulator 26 and the linear adder 23 may be more fully understood by reference to FIG. 2 where the relationship between the input and output voltages of the adder 23 is depicted. The vector diagram shown in FIG. 2 illustrates a specific instance of a measurement of the real component of the impedance of a test device 11 by measuring the voltage drop across it. As heretofore described, in order to measure this real component of the impedance of the test device 11 the switch 15 is connected to the variable reactance C. The variable reactance C may be either capacitive or inductive. For the present explanation a capacitive reactance C will be assumed. Also, since the real component of impedance of the test device is being measured, the switch 12 is thrown to the right.

In order t osimplify the explanation, the vector diagram of FIG. 2 is shown for just one instantaneous fixed frequency. The effect of the frequency sweep will be illustrated subsequently in FIG. 3. The current passing through the test device 11 and resistor R1 is represented by the current vector 201. The voltage drop across the test device 11 is represented by the voltage vector 203.

The voltage drop across the reactance C is represented by the voltage vector 204 which is plotted on the vertical axis of the vector diagram in FIG. 2. Since a capacitive reactance C is being used, the voltage will lag the current, hence the voltage vector 204 is plotted at a 90 degree lag angle. This voltage is applied to the input port 24 of the modulator circuit 26. The input voltage, represented by the vector 204, is modulated by the carrier signal generated by oscillator 29 and is thus converted into a voltage of varying magnitude. Selected examples of this varying magnitude are shown by the respective voltage vectors 204, 206, 207, and 208. This modulated voltage is applied, via the amplifier 31, to the input port 22 of the linear adder 23.

The summation of the voltage inputs at the input ports 21 and 22 of the adder 23 result in the vector voltages 214, 216, 217, and 218. The summed or total vector voltage will trace the locus 211 as the voltage 204 is modulated. The locus 211 includes a voltage minimum point 210 where the locus crosses the horizontal axis of the vector diagram. Now as will be evident to those skilled in the art, the total vector voltage at this voltage minimum point 210 is equal to the real component of the voltage drop across the test device 11. It can be readily seen from the foregoing that as the voltage represented by the voltage vector 204 is modulated, the locus 211 of the sum of voltages 203 and 204 defines the real component of the voltage vector 203 where it intersects the horizontal axis of the vector diagram.

It should be readily apparent that if the vector voltage 204 was directed in the opposite direction the locus of the total voltage vector would not intersect the voltage minimum point 210. To avert a situation in which the modulated voltage 204 is applied at the incorrect phase angle, the switch 30 is interposed in the path, through which the modulated voltage 204 is applied to the linear adder 23, to rapidly alternate the phase by 180 degrees. The effect of this phase alternation on the resultant oscilloscope trace will be explained below.

Figure 3:
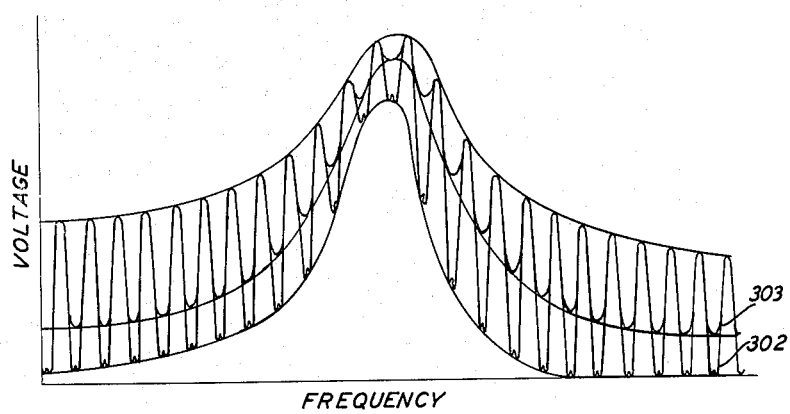
FIG. 3 is a diagram of a typical oscilloscope trace representing the voltage drop across the test device over a selected frequency range.

The output voltage at the port 32 is passed through a third amplifier 33, a demodulator shown as a detector 34, and a low-pass filter 35, and applied to one set of deflection plates of the oscilloscope 36. The filter 35 is designed to suppress the frequencies of the test voltage and isolate the desired envelope characteristic. A sawtooth voltage derived from the source 1 and synchronized with the sweep voltage is obtained at the output port 4 and applied to the other set of deflection plates of the oscilloscope 36. A typical view on the oscilloscope 36, as it represents the trace of the resultant total voltage vector, is shown in FIG. 3. It will be noted that this trace comprises two envelope curves superimposed upon each other. The double trace is due to the aforementioned switching action of the switch 30 which is operated at some high rate as indicated hereinbefore. The curve 302 with the reduced maxima trace (i.e. dimple) intermediate two minima traces represents the voltage trace of the resultant total vector as shown in FIG. 2 as it passes through the minimum point 210. The curve 303 represents the situation, not shown by the vector diagram in FIG. 2, where the modulated voltage is reversed in phase with respect to the voltage represented by vector 204. In this condition, the trace of the resultant voltage vector does not pass through the minimum point 210. These opposite phase traces are caused by the switching action of the rapid acting switch 30. The lower voltage trace with the dual minima points represents the magnitude of the real component of the voltage drop across the test device 11. The change in magnitude in this voltage with the change in frequency is due to the change in loading effect that is attributed to the inductive and capacitive elements of the test device 11 as frequency changes. It is to be understood that the above illustration represents only one of many possible trace patterns. However, the principles of interpretation will be the same for other trace patterns. As will be clear to those in the art, if the circuit, including the oscilloscope, is initially calibrated by substituting one or more standard components for the device 11, a direct reading resistance indication can be had.

The switch 30 in the preferred embodiment is operated at a sufficiently fast rate that the impression of a continuous display is obtained by the observer. The switching may be done by hand, but is preferably accomplished by an automatic drive, indicated by the box 40. A satisfactory display can be obtained with a switching rate which is one half the sweep rate of the test voltage. Under these circumstances, the luminous display on the oscilloscope screen will have a clearly defined lower envelope. The distance of any point on this envelope from the zero line on the screen is a measure of the magnitude of the resistance, the reactance, the conductance, or the susceptance of the device under test, at the frequency represented by that point. If the modulator 26 has a linear response, this distance is proportional to the magnitude of the desired quantity. In the case of reactance and susceptance measurements, the correct sign is determined from an observation of the setting of the switch 30 during the measurement of the resistance or the conductance of the device under test.

The elements R1, R2, and C have impedances large enough that the voltage drop across them is sufficient to supply the required input voltages for the amplifier 19 or the modulator 26. Preferably, the impedances of these elements do not greatly exceed these values. The input impedance of the amplifier 19 must be large compared to the impedance of R1, and also the impedance of the modulator 26 at the input port 24 must be large compared to that of R2 or C, to reduce the loading effect to a tolerable amount and to avoid the introduction of phase errors.

It is to be understood that the above-described arrangement is only illustrative of the application of the principles of the invention. Numerous other arrangements may be devised by those skilled in the art without departing from the spirit and scope of the invention.

What is claimed is:

1. An electical testing circuit for separately displaying the real and the imaginary components of the impedance or admittance of an electrical device over a selected range of frequencies comprising a source having an input port and two output ports, the first output port providing a test voltage which periodically sweeps over the selected range and the second output port providing a unidirectional saw-tooth sweep voltage synchronized with the sweep frequency of the test voltage, a closed transmission loop connected across the first output port, the loop including three serially connected elements, the first two of these elements, counting from a terminal of the first output port being, in the order named, the device under test and a first resistor when admittance is being measured, and the order of these two elements being reversed when impedance is being measured, a feedback path from the terminals of the first of these two elements to the input port of the source of maintaining a constant voltage drop across the first element over the swept frequency range, a linear adder having two input ports, a transmission path from the terminals of the second element in the loop to the first input port of the adder, the third element in the loop being a second resistor when the reactance or susceptance of the device under test is being measured and being a reactor when resistance or conductance is being measured, an amplitude modulator, a transmission path from the terminals of the third element in the loop to an input port of the modulator, an amplifier having two output ports with reversed voltage, a transmission path from the output port of the modulator to the input port of the amplifier, means for selectively impressing the voltage at one of the output ports of the modulator upon the second input port of the adder, an oscilloscope having a screen and two sets of deflection plates, means for demodulating the output voltage from the adder, means for suppressing any test frequencies present in the demodulated voltage, means for applying the resultant voltage to one set of plates, and means for applying the sweep voltage from the source to the other set of plates, whereby an envelope curve representing at each frequency the magnitude of the quantity being measured appears on the screen.

2. A circuit in accordance with claim 1 which includes switching means for reversing the order of the first two elements in the transmission loop.

3. A circuit in accordance with claim 2 which also includes switching means for connecting either the reactor or the second resistor into the transmission loop.

4. A circuit in accordance with claim 1 which includes switching means for connecting either the reactor or the second resistor into the transmission loop.

5. A circuit in accordance with claim 1 in which the reactor is a capacitor.

6. A circuit in accordance with claim 1 which includes automatic means for selectively impressing the voltage at one of the output ports of the modulator upon the second input port of the adder.

7. An electrical testing circuit for separately displaying the resistive and the reactive components of the impedance of an electrical device over a selected range of frequencies comprising a source having an input port and two output ports, the first output port providing a test voltage which periodically sweeps over the selected range and the second output port providing a unidirectional saw-tooth sweep voltage synchronized with the sweep frequency of the test voltage, a closed transmission loop connected across the first output port, the loop including three serially connected elements, the first and second of which, counting in one direction from a terminal of the first output port, being, in the order named, a first resistor and the device under test, a feedback path from the terminals of the first resistor to the input port of the source for maintaining a constant voltage drop across the first resistor over the swept frequency range, a linear adder having two input ports, a transmission path from the terminals of the device under test to the first input port of the adder, the third element in the loop being a second resistor when the reactance of the device under test is being measured and being a reactor when the resistance is being measured, an amplitude modulator, a transmission path from the terminals of the third element in the loop to an input port of the modulator, an amplifier having two output ports with reversed voltage, a transmission path from the output port of the modulator to the input port of the amplifier, means for selectively impressing the voltage at one of the output ports of the modulator to the second input port of the adder, an oscilloscope having a screen and two sets of deflection plates, means for demodulating the output voltage from the adder, means for suppressing any test frequencies present in the demodulated voltage, means for applying the resultant voltage to one set of plates, and means for applying the sweep voltage from the source to the other set of plates, whereby an envelope curve representing at each frequency the magnitude of the resistance or the reactance being measured appears on the screen.

8. An electrical testing circuit for separately displaying the conductance and the susceptance of the admittance of an electrical device over a selected range of frequencies comprising a source having an input port and two output ports, the first output port providing a test voltage which periodically sweeps over the selected range and the second output port providing a unidirectional, saw-tooth sweep voltage synchronized with the sweep frequency of the test voltage, a closed transmission loop connected across the first output port, the loop including three serially connected elements, the first of which, counting in one direction from a terminal of the first output port, being, in the order named, the device under test and a first resistor, a feedback path from the terminals of the device under test to the input port of the source for maintaining a constant voltage across the device under test over the swept frequency range, a linear adder having two input ports, a transmission path from the terminals of the first resistor to the first input port of the adder, the third element in the loop being a second resistor when the susceptance of the device under test is being measured and being a reactor when the conductance is being measured, an amplitude modulator, a transmission path from the terminals of the third element in the loop to an input port of the modulator, an amplifier having two output ports with reversed voltage, a transmission path from the output port of the modulator to the input port of the amplifier, means for selectively impressing the voltage at one of the output ports of the modulator to the second input port of the adder, an oscilloscope having a screen and two sets of deflection plates, means for demodulating the output voltage from the adder, means for suppressing any test frequencies in the demodulated voltage, means for applying the resultant voltage to one set of plates, and means for applying the sweep voltage from the source to the other set of plates, whereby an envelope curve representing at each frequency the magnitude of the conductance or the susceptance being measured appears on the screen.

No references cited.

WALTER L. CARLSON, *Primary Examiner.*

G. L. LETT, *Assistant Examiner.*